(12) United States Patent
Chadwick et al.

(10) Patent No.: US 11,778,198 B2
(45) Date of Patent: *Oct. 3, 2023

(54) METHOD FOR GENERATING VIDEO- AND AUDIENCE-SPECIFIC ENCODING LADDERS

(71) Applicant: Mux, Inc., San Francisco, CA (US)

(72) Inventors: Nick Chadwick, San Francisco, CA (US); Adam Brown, San Francisco, CA (US); Jon Dahl, San Francisco, CA (US); Masroor Hasan, San Francisco, CA (US); Ben Dodson, San Francisco, CA (US)

(73) Assignee: Mux, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,154

(22) Filed: Oct. 6, 2021

(65) Prior Publication Data

US 2022/0030229 A1 Jan. 27, 2022

Related U.S. Application Data

(62) Division of application No. 16/820,592, filed on Mar. 16, 2020, now Pat. No. 11,343,492.

(Continued)

(51) Int. Cl.
*H04N 11/02* (2006.01)
*H04N 19/149* (2014.01)
(Continued)

(52) U.S. Cl.
CPC ......... *H04N 19/149* (2014.11); *G06F 18/214* (2023.01); *G06V 10/454* (2022.01);
(Continued)

(58) Field of Classification Search
CPC .... H04N 19/115; H04N 19/139; H04N 19/14; H04N 19/177; G06V 20/46; G06K 9/6256
(Continued)

(56) References Cited

U.S. PATENT DOCUMENTS

10,547,856 B2 * 1/2020 De Cock ............ H04N 21/8456
11,343,492 B2 * 5/2022 Chadwick ............ G06V 10/454
(Continued)

*Primary Examiner* — Jayanti K Patel
*Assistant Examiner* — Richard B Carter
(74) *Attorney, Agent, or Firm* — Run8 Patent Group, LLC; Peter Miller (57) ABSTRACT

A method including: extracting a set of video features representing properties of a video segment; generating a set of bitrate-resolution pairs based on the set of video features, each bitrate-resolution pair in the set of bitrate-resolution pairs defining a bitrate and defining a resolution estimated to maximize a quality score characterizing the video segment encoded at the bitrate; accessing a distribution of audience bandwidths; selecting a top bitrate-resolution pair in the set of bitrate-resolution pairs; selecting a bottom bitrate-resolution pair in the set of bitrate-resolution pairs; selecting a subset of bitrate-resolution pairs in the set of bitrate-resolution pairs based on the distribution of audience bandwidths, the subset of bitrate-resolution pairs defining bitrates less than the top bitrate and greater than the bottom bitrate; and generating an encoding ladder for the video segment comprising the top bitrate-resolution pair, the bottom bitrate-resolution pair, and the subset of bitrate-resolution pairs.

20 Claims, 4 Drawing Sheets

Related U.S. Application Data

(60) Provisional application No. 62/819,277, filed on Mar. 15, 2019.

(51) Int. Cl.
| | |
|---|---|
| *H04N 19/115* | (2014.01) |
| *H04N 19/177* | (2014.01) |
| *H04N 19/139* | (2014.01) |
| *H04N 19/14* | (2014.01) |
| *G06V 20/40* | (2022.01) |
| *G06F 18/214* | (2023.01) |
| *G06V 10/764* | (2022.01) |
| *G06V 10/77* | (2022.01) |
| *G06V 10/82* | (2022.01) |
| *G06V 10/44* | (2022.01) |

(52) U.S. Cl.
CPC ........ *G06V 10/764* (2022.01); *G06V 10/7715* (2022.01); *G06V 10/82* (2022.01); *G06V 20/46* (2022.01); *H04N 19/115* (2014.11); *H04N 19/139* (2014.11); *H04N 19/14* (2014.11); *H04N 19/177* (2014.11)

(58) Field of Classification Search
USPC .................................. 375/240.08; 348/7.086
See application file for complete search history.

(56) References Cited

U.S. PATENT DOCUMENTS

| | | | |
|---|---|---|---|
| 2002/0069265 A1* | 6/2002 | Bountour | H04N 21/47211 |
| | | | 348/E7.086 |
| 2016/0295216 A1* | 10/2016 | Aaron | H04N 21/23418 |
| 2019/0379895 A1* | 12/2019 | Katsavounidis | H04N 19/103 |

\* cited by examiner

METHOD FOR GENERATING VIDEO- AND AUDIENCE-SPECIFIC ENCODING LADDERS

CROSS-REFERENCE TO RELATED APPLICATIONS

This Application is a divisional application of U.S. patent application Ser. No. 16/820,592, entitled "Method for Generating Video- and Audience-Specific Encoding Ladders" and filed on 16 Mar. 2020, which claims the benefit of U.S. Provisional Application No. 62/819,277, filed on 15 Mar. 2019, which is incorporated in its entirety by this reference.

TECHNICAL FIELD

This invention relates generally to the field of video encoding and streaming and more specifically to a new and useful method for generating video specific encoding ladders in the field of video encoding and streaming.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
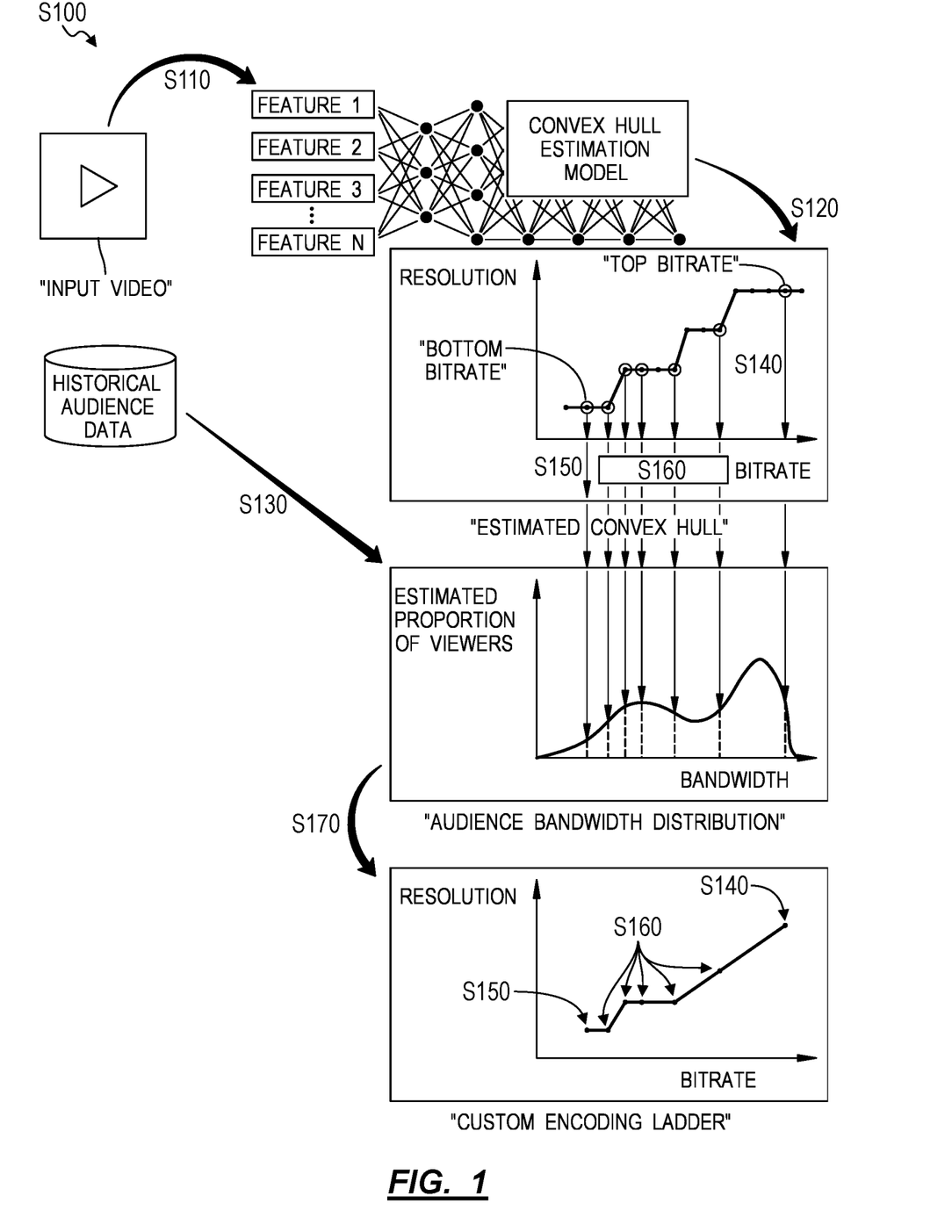
FIG. 1 is a flowchart representation of a method.

As shown in FIG. 1, a method S100 includes: extracting a set of video features representing properties of a video segment in Block S110; generating a set of bitrate-resolution pairs based on the set of video features via a convex hull estimation model, each bitrate-resolution pair in the set of bitrate-resolution pairs defining a bitrate and defining a resolution estimated to maximize a quality score characterizing the video segment encoded at the bitrate in Block S120; accessing a distribution of audience bandwidths representative of likely viewers of the video segment in Block S130; selecting a top bitrate-resolution pair in the set of bitrate-resolution pairs, the top bitrate-resolution pair defining a top bitrate in Block S140; selecting a bottom bitrate-resolution pair in the set of bitrate-resolution pairs, the bottom bitrate-resolution pair defining a bottom bitrate in Block S150; selecting a subset of bitrate-resolution pairs in the set of bitrate-resolution pairs based on the distribution of audience bandwidths, the subset of bitrate-resolution pairs defining bitrates less than the top bitrate and greater than the bottom bitrate in Block S160; and generating an encoding ladder for the video segment including the top bitrate-resolution pair, the bottom bitrate-resolution pair, and the subset of bitrate-resolution pairs in Block S170.

Figure 2:
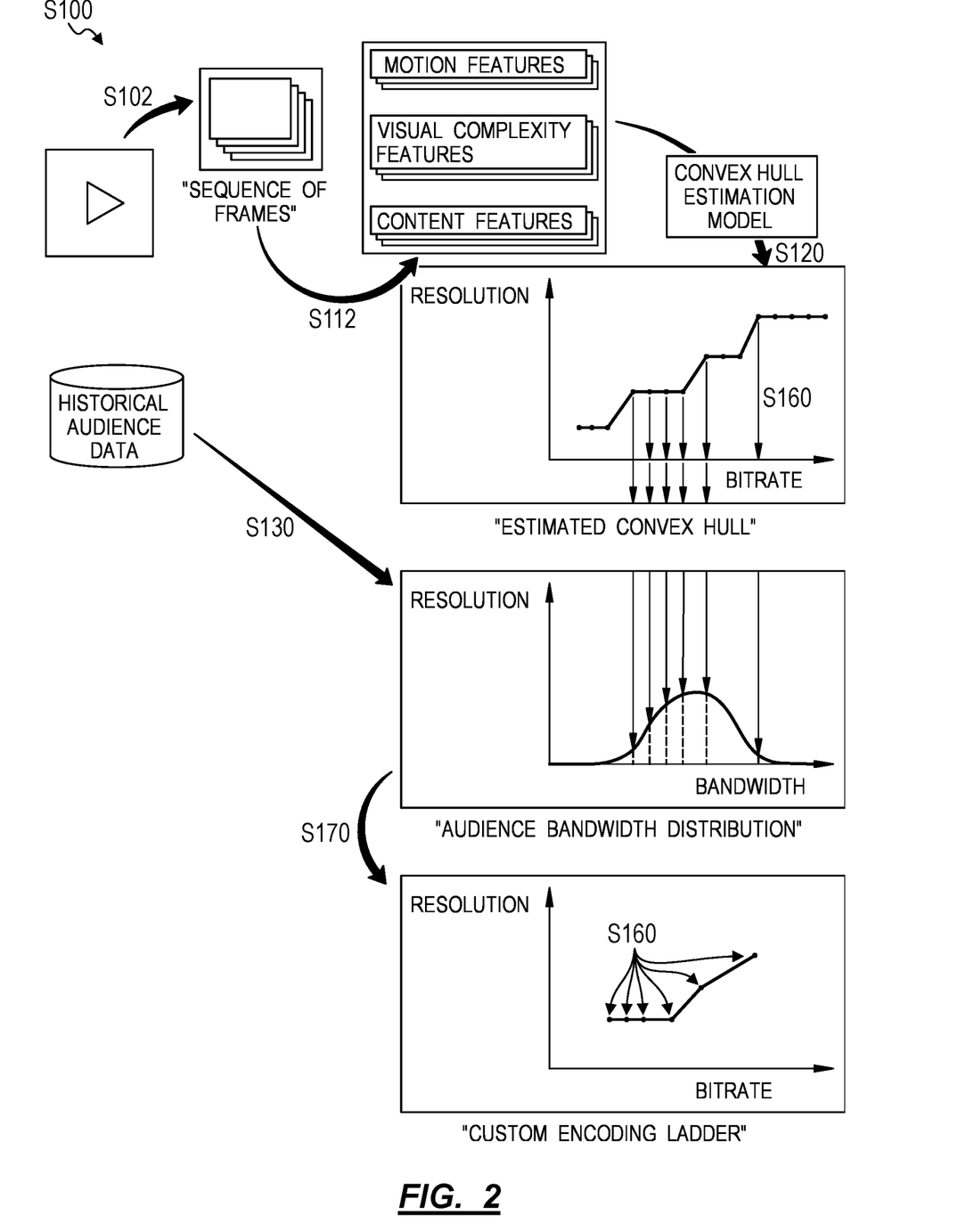
FIG. 2 is a flowchart representation of the method.

As shown in FIG. 2, a variation of the method S100 includes: sampling a sequence of frames from a video segment in Block S102; extracting a set of video features representing properties of the video segment based on the sequence of frames, the set of video features including a set of motion features, a set of visual complexity features, and a set of content features in Block S112; generating a set of bitrate-resolution pairs based on the set of video features via a convex hull estimation model, each bitrate-resolution pair in the set of bitrate-resolution pairs defining a bitrate and defining a resolution estimated to maximize a quality score characterizing the video segment encoded at the bitrate in Block S120; accessing a distribution of audience bandwidths representative of likely viewers of the video segment in Block S130; selecting a subset of bitrate-resolution pairs in the set of bitrate-resolution pairs based on the distribution of audience bandwidths in Block S160; and generating an encoding ladder for the video segment including the subset of bitrate-resolution pairs in Block S170.

Figure 3:
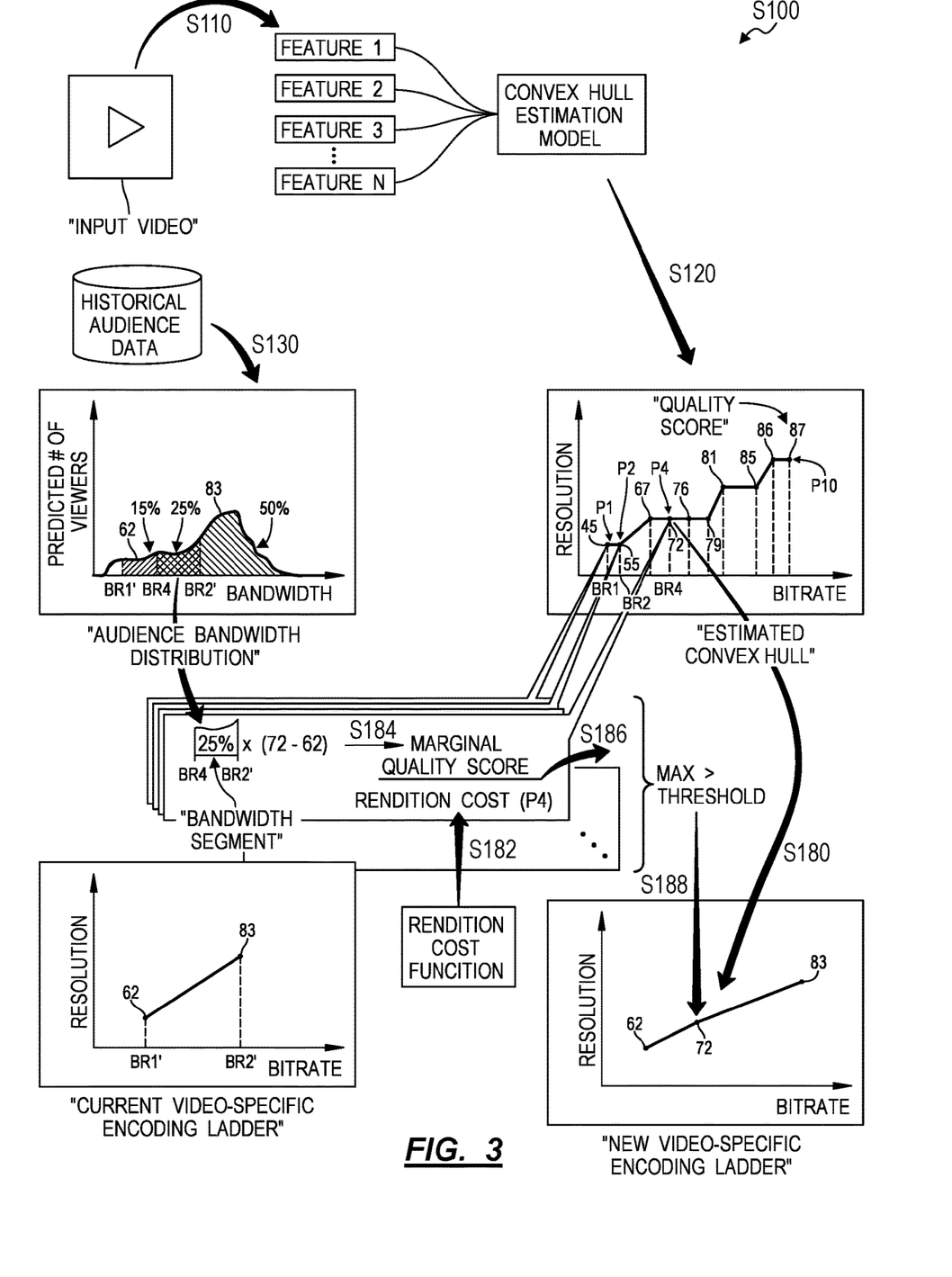
FIG. 3 is a flowchart representation of the method.

As shown in FIG. 3, a variation of the method S100 includes: extracting a set of video features representing properties of a video segment in Block S110; generating a set of bitrate-resolution pairs based on the set of video features via a convex hull estimation model, each bitrate-resolution pair in the set of bitrate-resolution pairs defining a bitrate and defining a resolution estimated to maximize a quality score characterizing the video segment encoded at the bitrate in Block S120; accessing a distribution of audience bandwidths representative of likely viewers of the video segment in Block S130; appending successive bitrate-resolution pairs in the set of bitrate resolution pairs to an encoding ladder for the video segment based on a marginal quality-per-cost score of each bitrate-resolution pair in the set of bitrate-resolution pairs, the marginal quality-per-cost score based on the distribution of audience bandwidths and a current set of bitrate-resolution pairs in the encoding ladder in Block S180.

2. Applications

Generally, the method S100 is executed by a computer system (hereinafter "the system") to generate a video-specific encoding ladder (e.g., a manifest file, such as an HLS manifest) specific to an input video that improves video quality (e.g., compared to a fixed bitrate ladder) over a range of bitrates and resolutions based on visual-, motion-, and content-related features of the video. Additionally, the system can generate the video-specific encoding ladder without performing trial encodes of the input video, thereby enabling fast publishing times of the input video as an internet video stream and reducing the computational cost of generating the video-specific encoding ladder. Furthermore, the system can generate a video-specific encoding ladder that includes renditions of the input video that improve viewing quality over a distribution of audience bandwidths typical of viewers of the input video. Thus, the system takes in an input video and generates a video-specific encoding ladder that improves video quality based on features of the video and representative audience data in near real-time, enabling sub-ten-second publishing time for internet video streams with video-specific encoding ladders.

More specifically, the system generates the video-specific encoding ladder by: sampling a sequence of frames from an input video; extracting a set of video-level features from the sequence of frames; estimating a set of bitrate-resolution pairs that are predicted to maximize quality of the input video over a range of bitrates (e.g., 54 bitrate-resolution pairs between 250 kbps and 10,000 kbps) while controlling for the computational costs of the estimation; selecting a top bitrate and/or a bottom bitrate from the set of bitrate-resolution pairs; and selecting a subset of the bitrate-resolution pairs between the top bitrate and the bottom bitrate that improve viewing experience across a predicted distribution of audience bandwidths and bitrates (e.g., a measured or predicted distribution of bitrates for viewers of the input video).

When sampling frames from an input video, the system can select frames evenly across the duration of the input video. Alternatively, the system can intelligently sample frames from the input video that are more representative of the visual and content characteristics of the video in order to improve the accuracy of subsequent feature extraction (e.g., by sampling from each identified scene in the input video according to scene detection algorithms).

Once the system samples a sequence of frames from the input video, the system extracts a set of features based on the sequence of frames. The set of features can represent the visual complexity of the sequence of frames, the motion characteristics of the video, the content type of the video (e.g., sports, games, news, animation) and/or any other characteristic of the video. The system can extract features from the sequence of frames by calculating set of complexity and motion metrics while separately classifying the content type of the video. Additionally or alternatively, the system can utilize pre-trained machine learning models and/or computer vision models to extract a set of spatial or temporal features from the sequence of frames of the input video. Furthermore, the system can include a video-specific trained feature extraction model in order to extract features that are directly relevant to encoding decisions for the input video.

Upon extracting the set of features for the input video, the system estimates a set of bitrate-resolution pairs that are predicted to maximize the viewing quality of an encoding of the input video (i.e. a rendition of input video) at the bitrate and resolution specified by the bitrate-resolution pair. In one example, the system can estimate a quality-maximizing resolution for each bitrate in a predetermined bitrate ladder, wherein the system selects the quality-maximizing resolution for each bitrate from set of discrete resolutions (e.g., 1280×720, 1920×1080, 2560×1440). Furthermore, the system can estimate bitrate-resolution pairs that are predicted to maximize the viewing quality of a video according to a video quality metric, such as peak signal-to-noise-ratio (hereinafter "PSNR"), structural similarity index (hereinafter "SSIM"), Multiscale SSIM, or video multimethod assessment fusion (hereinafter "VMAF"). Once estimated by the system, the set of bitrate-resolution pairs can approximate a "convex hull" of encoding parameters for the input video, wherein any increase in resolution at the same bitrate or decrease in resolution at the same bitrate does not improve the viewing quality of the encoded input video.

In one implementation, the system develops a corpus of training examples and trains a machine learning model (e.g., a long short-term memory recurrent artificial neural network) in order to estimate the set of quality-maximizing bitrate-resolution pairs (i.e. the estimated convex hull) of an input video for a range of bitrates. In this implementation, each training example includes: a set of video-level features characterizing a training video; and a set of bitrate-resolution pairs that maximize the viewing quality of the training video at each bitrate. The system can then train the machine learning model by executing a supervised learning algorithm for the machine learning model based on the corpus of training examples.

After estimating a set of bitrate-resolution pairs, the system can select a top bitrate and/or a bottom bitrate of the video-specific encoding ladder. The system can select a top bitrate by estimating a bitrate above which there are diminishing returns in the quality of the encoding of the input video or by determining the bitrate that achieves a targeted visual quality. The system can also select a bottom bitrate by estimating the lowest bitrate encoding of the input video that achieves a threshold quality or by selecting a bitrate that is supported by a target percentage of a predicted viewing audience's bandwidth distribution. In one implementation, the system executes conditional logic based on the set of bitrate-resolution pairs of the input video to select the top bitrate and/or the bottom bitrate for the input video's video-specific encoding ladder. Alternatively, the system trains a second machine learning model (e.g., a boosted tree model) to select the top bitrate and/or the bottom bitrate. The second machine learning model takes in the set of bitrate-resolution pairs and outputs the top bitrate and/or bottom bitrate for the video-specific encoding ladder.

Upon selecting the top bitrate and/or bottom bitrate, the system can then select additional bitrate-resolution pairs characterized by bitrates below the top bitrate and/or above the bottom bitrate based on video audience data. The system can select any number of bitrate-resolution pairs depending on the number of renditions desired for the video-specific encoding ladder for the input video. In one implementation, the system can access a set of audience data indicating a distribution of bandwidths, which enables the system to identify the renditions that are viewable to a population of viewers (e.g., a population of viewers of a type of video similar to the input video, a general population of internet streaming viewers) and select a subset of bitrate-resolution pairs for inclusion in the video-specific encoding ladder from the set of bitrate-resolution pairs based on the distribution of viewer bandwidths indicated by the audience data. Alternatively, the system can select a subset of bitrate-resolution pairs for the video-specific encoding ladder that evenly span a range of bitrates between the top bitrate and the bottom bitrate in the set of bitrate-resolution pairs.

In another implementation, the system can iteratively calculate a marginal quality-per-cost score for each of the bitrate-resolution pairs in the convex hull, where the marginal quality-per-cost score represents an aggregate improvement in viewing quality over the audience bandwidth distribution due to the addition of the bitrate-resolution pair to the encoding ladder in proportion to the marginal cost (e.g., encoding cost, storage cost, and/or distribution cost) of adding the bitrate-resolution pair to the encoding ladder for the input video. Upon calculating a marginal quality-per-cost score for each bitrate-resolution pair in the convex hull, the system can select the bitrate-resolution pair from the convex hull that is characterized by a maximum marginal quality-per-cost score assuming that value is greater than a threshold marginal quality-per-cost score.

Once the system generates a video-specific encoding ladder for the video, the system can encode separate renditions of the input video at the bitrate and resolution specified by each bitrate-resolution pair included in the video-specific encoding ladder. The system can then publish an internet video stream (e.g., by generating an HLS manifest file specifying available renditions of the input video) with a video-specific encoding ladder for an input video that is predicted to maximize quality at any of the bitrates included in the video-specific encoding ladder without performing additional encodes to determine the quality of the video at various bitrates and resolutions.

The term "input video," as used herein, refers to a video of any length or a video segment within a longer video. For example, the system can segment a full-length video into multiple video segments and treat each video segment as a separate input video.

The term "rendition," as used herein, refers to an encoding of a video according to a particular bitrate-resolution pair or the particular bitrate-resolution pair itself depending on context.

The term "encoding ladder," as used herein, refers to set one or more renditions that can be encoded and streamed based the available bitrate for the internet video stream. Thus, the stream plays back the highest bitrate rendition that is less than the viewer's available bandwidth.

3. Frame Sampling

Generally, in Block S102, the system samples a sequence of frames from the input video that represent the visual, motion, and content characteristics of the input video. More specifically, the system can access or receive a video file of the input video in an uncompressed or high definition format from which individual frames can be reconstructed and extracted without significant encoding artifacts or blur. However, the system can access or receive an input video in any format. The system can select particular frames from the input video to extract features of the input video for analysis and to generate the video-specific encoding ladder for the input video.

In one implementation, the system samples the sequence of frames from the input video at a predetermined sampling interval within the video (e.g., one frame for every second of the input video) up to a maximum number of frames (e.g., 100 frames). The system can calculate the sampling interval for sampling frames from the input video such that the system samples up to the maximum number of frames from the input video. Alternatively, the system can sample frames at a predefined sampling interval and stop sampling upon reaching the maximum number of frames.

In another implementation, the system identifies groups-of-pictures (hereinafter "GOPs") in the original encoding of the input video and extracts at least one frame from each GOP or samples the GOPs (e.g., the I frame of each GOP) up to a maximum number of frames. More specifically, the system can identify a set of GOPs in the video segment; and sample the I-frame from each group-of-pictures in the video segment.

Alternatively, the system can execute a scene detection algorithm on the input video to detect scenes within the input video and extract a set of sample frames from each scene. Additionally, after detecting each scene in the input video, the system can cluster similar scenes and extract a set of sample frames from each cluster of scenes. Furthermore, in response to detecting scenes greater than a threshold duration in the input video, the system can segment the input video into multiple input video segments and execute Blocks of the method S100 on each input video segment.

In yet another implementation, the system can detect variability in image complexity of an input video and adjust the number and/or distribution of samples according to the variability of the input video. In one example, the system measures variability by calculating the image complexity of a first sample of frames within the video and measuring the variability (i.e. variance or standard deviation) in the image complexity of the first sample of frames. If the variability is high (e.g., above a threshold variance), the system can increase the maximum number of sample frames extracted from the input video. Alternatively, the system can respond to high variance in image complexity across frames by subsequently performing scene detection to ensure that the system extracts frames from each scene within the input video.

Additionally or alternatively, the system can extract metadata from the input video and correlate the metadata with the variability of the video. For example, the system can access a tag associated with an input video indicating that the video is a conference call and estimate that the video is characterized by low variability. After estimating the variability of the input video based on metadata, the system can extract sample frames from the input video according to the estimated variability of the input video.

The system can also sample a sequence of frames for each type of feature extracted by the system for input into the convex hull estimation model. For example, the system can: extract single frames distributed evenly in the input video in order to calculate visual complexity features and content features for the input video; and extract a set of consecutive series of frames from the input video in order to calculate motion features for the input video. Thus, the system can sample sequences of frames from the input video that best represent the input video for the purpose of various metrics and/or models.

4. Feature Extraction

Generally, in Block S110, the system extracts a set of video features representing properties of a video segment. More specifically, the system can extract features representative of the visual complexity, motion, content, and/or any other characteristic of the input video based on a number of visual complexity, motion, and/or content specific metrics and/or models. Thus, the system can generate a video-level feature vector that acts as a representation of the input video. The system can then input this representation of the input video into the convex hull estimation model in order to estimate a set of bitrate-resolution pairs that are estimated to maximize the quality of the input video at each given bitrate without performing any trial encodes of the input video.

In order to generate a set of visual complexity features for the video-level feature vector of the input video, the system: calculates a visual complexity metric (e.g., Shannon entropy or peak signal-to-noise ratio) for each frame in the sequence of frames; and calculates a central tendency statistic (e.g., mean, harmonic mean, median) and/or a variance measure of this visual complexity metric to generate a visual complexity feature in a video-level feature vector. The system can execute these steps for each of a set of visual complexity metrics to obtain multiple visual complexity features in the video-level feature vector.

In another implementation, the system can also extract a set of motion features for inclusion in the video-level feature vector. The system can: calculate a set of motion metrics characterizing the motion in consecutive (or adjacent) frames of the sequence of frames; and calculate a central tendency statistic and/or a variance measure of this motion metric to generate a motion feature in the video-level feature vector. Alternatively, the system can extract motion features directly from the input video (e.g., without sampling specific frames of the video). Thus, upon calculating a set of motion metrics for each consecutive set of frames in the sequence of frames, the system can merge these motion metrics into a set of motion features representative of the input video.

The system can also calculate a set of content features for inclusion in the video-level feature vector. In one implementation, the system can: separately classify each frame in the sampled sequence of frames into a predetermined set of content categories (e.g., sports, games, news). Thus, the system can then generate a content classification for each frame in the sampled sequence of frames. Alternatively, the system can input each frame of the sampled sequence of frames into a visual feature model such as a convolutional neural network for image classification (hereinafter "image classification model") such as a convolutional neural network characterized by the INCEPTION architecture (i.e. a neural network architecture characterized by multiple convolution filters operating at the same layer of the network). The system can utilize the image classification model to generate a frame-level feature vector for each frame, where each frame-level feature vector represents the classifiable visual features of the frame. In one example, the system extracts an intermediate layer activation (e.g., a layer immediately prior to the classification layer) from the image classification model as the frame-level feature vector for each frame. Thus, the system can extract a set of content features with more context regarding the content of the image than a singular classification of each frame.

Once the system obtains a set of frame-level content features (i.e. a single classification or a vector of frame-level features) for each frame in the sampling sequence of frames, the system can then merge the frame-level content features for each frame into a set of content features in the video-level feature vector, where these content features represent the content of the entire sequence of frames and, therefore, the whole input video. For example, the system can execute principle component analysis or any other dimensionality reduction technique on the set of frame-level feature vectors to obtain a set of content features for the sequence of frames.

The system can input the merged frame-level feature vectors into a taxonomic video classification model, such as a taxonomic video classification model trained on the YT8M dataset, to obtain a set of content features representative of the input video. In one example, the system can extract the set of content features from an intermediate layer (e.g., a layer immediately prior to the classification layer) of the taxonomic video classification model.

Thus, the system can extract a video-level feature vector for the input video including a set of visual complexity features, a set of motion features, and a set of content features. In particular, the system can extract a set of video features representing properties of the video segment based on the sequence of frames, the set of video features including a set of motion features, a set of visual complexity features, and a set of content features in Block S112. More specifically, the system can: calculate the set of motion features based on consecutive frames in the sequence of frames; for each frame in the sequence of frames, calculate a set of frame-level visual complexity features for the frame; merge the set of frame-level visual complexity features into the set of video-level visual complexity features; execute a video classification model on the sequence of frames; and extract an intermediate layer activation of the video classification model, to generate the set of content features.

5. Convex Hull Estimation

The system can estimate a convex hull of an input video that includes a set of bitrate-resolution pairs, where each bitrate-resolution pair defines the highest quality resolution at a given bitrate according to a particular quality metric and when viewed in a particular viewing condition. Alternatively, the system can estimate a convex hull according to a quality metric that is agnostic to the viewing condition of the video, such as peak signal-to-noise ratio (PSNR), structural similarity index (SSIM), and video multimethod assessment fusion for 1080p (VMAF1080p), Thus, each resolution in a bitrate-resolution pair including the convex hull is the "quality-maximizing" resolution for that bitrate given the unique characteristics of that video. Consequently, for a given bitrate, encoding the input video at a lower resolution may increase blur in the input video relative to the resolution included in the convex hull of the input video, and encoding the video at a higher resolution may increase the prevalence of encoding artifacts in the input video relative to the resolution included in the convex hull of the input video. Depending on the unique aspects of a particular input video, the shape of the convex hull for this input video (i.e. the values of the bitrate-resolution pairs in the convex hull) may differ. For example, a convex hull of a first input video may indicate that the quality maximizing resolution given a bitrate of one megabit-per-second is 720p, while a convex hull of a second input video may indicate that the quality maximizing resolution given the same bitrate is 1080p. Typically, the convex hull of an input video may be calculated using a "brute force" process that includes: executing a series of trial encodings of the input video at various bitrates and resolutions; evaluating the viewing quality of each of these encodings (e.g., according to a quality metric); and identifying the highest quality resolution for each trial bitrate. However, this process is expensive in processor time and storage requirements. Instead, the system can estimate the convex hull of an input video without performing any trial encodes of the input video, thereby reducing the expense of calculating the convex hull for an input video.

In Block S120, the system inputs the video-level feature vector extracted from the input video into a convex hull estimation model, such as a long short-term memory recurrent artificial neural network (hereinafter "LSTM"), to estimate a set of bitrate-resolution pairs that define an estimated convex hull for the input video. More specifically, the system can generate a set of bitrate-resolution pairs based on the set of video-level features via a convex hull estimation model, each bitrate-resolution pair in the set of bitrate-resolution pairs defining a bitrate and defining a resolution estimated to maximize a quality score characterizing the video segment encoded at the bitrate of the bitrate-resolution pair. Thus, the system can generate a convex hull describing the relationship between resolution and quality over a range of bitrates specific to a particular input video within the evaluation time of an artificial neural network (e.g., 500 milliseconds) or other machine learning model instead of executing a series of trail encodings of the input video.

In one implementation, the system can generate an estimated convex hull for an input video via the convex hull estimation model, where the estimated convex hull also predicts an estimated quality (according to a quality metric) of the input video when encoded according to each bitrate-resolution pair. For example, the system can generate an estimated convex hull for an input video that specifies that the quality maximizing resolution for the input video at one megabit-per-second is estimated to be 720p and the quality of the input video when encoded at the bitrate of one megabit-per-second and at the resolution of 720p is estimated to be a quality score of 85, as measured by VMAF. Therefore, by also estimating the quality of the input video at each bitrate-resolution pair in the estimated convex hull, the system can more effectively select, for the video-specific encoding ladder of the input video, bitrate-resolution pairs from the estimated convex hull of an input video that result in the largest improvements in viewing quality for a given audience of the input video.

However, in order to ensure that the convex hull estimation model outputs an accurate convex hull (e.g., a convex hull that actually represents the quality maximizing resolution for the input video over a series of bitrates), the system or another computer system in cooperation with the system, can train the convex hull estimation model according to the process described below.

The system can also execute multiple convex hull estimation models, where each convex hull estimation model outputs estimated convex hulls that indicate quality-maximizing resolutions for the input video when encoded over a range of bitrates and viewed in a particular viewing condition. For example, the system can train a separate convex hull estimation model for a 4K television viewing condition, a 1080p television viewing condition, for a mobile viewing condition, and/or for a laptop viewing condition. Therefore, when executing subsequent Blocks of the method S100, the system can access audience viewing condition data and better select bitrate-resolution pairs for a video-specific encoding ladder of the input video that improve the viewing quality for the most viewers across multiple different viewing conditions.

5.1 Training

The system (or a related training system coordinating with the system) can train the convex hull estimation model (e.g., a machine learning model such as an LSTM) based on a corpus of training examples according to a training process. More specifically, the system can: access a set of training video segments. Then, for each training video segment in the set of training video segments, the system can: extract a set of training video features representing properties of the training video segment; generate a training feature vector for the training video segment based on the set of training video features; encode a set of trial encodes of the training video segment; calculate a quality score of each trial encode in the set of trial encodes according to a quality metric to generate a set of quality scores; identify a convex hull of the training video segment based on the set of trial encodes and the set of quality scores of the set of trial encodes, the convex hull including a subset of trial encodes in the set of trial encodes that are characterized by a maximum quality score at each encoding bitrate in the set of trial encodes; and generate a training example including the training feature vector and the convex hull of the training video segment. The system can then: compile each training example into a set of training examples; and train the convex hull estimation model based on the set of training examples.

Thus, in order to train the convex hull estimation model, the system can access a set of training videos; identify the convex hull of each training video according to a quality metric; extract a set of video-level features for each training video thereby generating a corpus of training examples, wherein each training example includes a set of video level features and a convex hull of a training video; and execute a supervised learning algorithm utilizing the corpus of training examples and the convex hull estimation model.

However, the system can apply other learning algorithms to the convex hull estimation model in order to provide accurate and computationally inexpensive estimates of the convex hull of an input video such as unsupervised, adversarial, and/or reinforcement learning algorithms.

5.1.1 Datasets

Generally, when accessing a set of training videos, the system can access a set of training videos that are representative of desired input videos. Users of the system may curate a specific set of training videos to effectively bias or improve the convex hull estimation of the convex hull estimation model for a specific category of input video. Thus, the system can train separate convex hull estimation models, wherein each convex hull estimation model is based on a specific curated set of training videos. For example, the system can train a convex hull estimation model for sports videos by accessing a set of sports-related training videos. Additionally, the system can evaluate the set of training videos against additional (e.g., multiple) sets of quality metrics such that the system can train separate convex hull estimation models for different use cases where different quality metrics may be more relevant (i.e. mobile device viewing versus television screen viewing). Furthermore, the system can evaluate the set of training videos according to quality metrics optimized for different viewing conditions in order to train a convex hull estimation model for each supported viewing condition in a set of supported viewing conditions.

5.1.2 Convex Hull Identification

Figure 4:
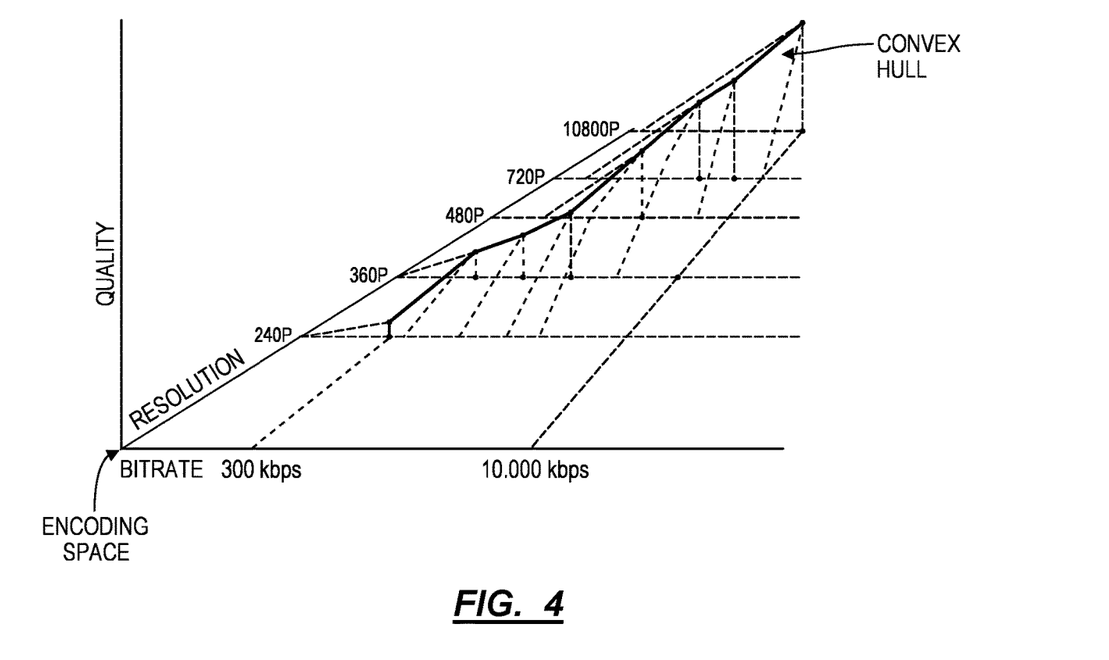
FIG. 4 is a conceptual representation of a quality-bitrate-resolution graph.

Upon accessing the set of training videos, the system can calculate the convex hull, as shown in FIG. 4, for each of the set of training videos according to a quality metric, such as via a series of trial encodings in a trial encoding process. When calculating the convex hull for each training video the system can calculate the convex hull according to any quality metric or a consensus of multiple quality metrics, such as mean square error (MSE), PSNR, SSIM, Multiscale SSIM (MS-SSIM), or video multimethod assessment fusion (VMAF). The system can calculate the quality metric according to a subset of frames from a rendition of a training video. In one example, the system evaluates the quality metric for each frame of the rendition of the training video. In another example, the system evaluates the quality metric for sample sequence of frames from the training video. The system can then calculate a central tendency statistic, such as the mean, geometric mean, or harmonic mean, to calculate a value indicating to overall quality of the rendition of the training video. Additionally or alternatively, the system can remove outliers and/or otherwise precondition the distribution of quality values across frames of the rendition of the training video before calculating a value of the quality metric for the rendition of the training video.

To initiate calculation of a convex hull of a training video, the system can encode an initial rendition of the training video at a low bitrate as a first step in the trial encoding process (e.g., 200 kbps and 180p). The system can then evaluate the quality of the rendition according to the quality metric. Subsequently, the system can increase the bitrate and/or resolution and again evaluate the rendition according to the quality metric. The system can repeat this process until the system evaluates a rendition with a quality metric higher than threshold quality (e.g., a VMAF score of 90).

Alternatively, to initiate calculation of a convex hull of a training video, the system can encode an initial rendition of the training video at a high bitrate and a high resolution as a first step in the trial encoding process. For example, the system can encode an initial rendition at a bitrate greater than 99% of internet streaming viewers or a highest supported bitrate of the system (e.g., 8,000 kbps, 14,000 kbps). Correspondingly, the system can encode the initial rendition at a highest supported resolution such as 4K or 1080p resolution. Once the system has encoded the initial rendition of the training video, the system calculates the quality of the rendition according to a predetermined quality metric or consensus of quality metrics.

Upon evaluating the quality of the initial rendition according to the chosen quality metric and storing the quality of the initial rendition, the system selects a bitrate for second and third trial renditions. The bitrate of the second and third trial renditions can be selected as a percentage decrement of the maximum bitrate or as a predetermined or adjustable bitrate decrement. Once the system has selected a bitrate for the second trial rendition and third trial renditions, the system can encode the second rendition at the maximum supported resolution and at the selected bitrate and can also encode the third trial rendition at the selected bitrate and at a first resolution below the maximum supported resolution in a supported set of discrete resolutions. For example, if the system encodes at a maximum supported resolution of 4K and a second highest supported resolution of the system is 1080p the system can encode the second rendition at the decremented bitrate and 4K resolution and the third resolution at the decremented bitrate and 1080p resolution. After encoding the second and third renditions of the training video, the system can then calculate a quality metric for each of the second rendition and the third rendition and can select the quality-maximizing resolution for inclusion in the convex hull of the training video at the selected bitrate. The system can continue decrementing the selected bitrate for encoding trial renditions or stepping down a predetermined bitrate ladder to test adjacent discrete resolutions over a range of bitrates (e.g., from 10,000 kbps to 250 kbps). In one implementation, the system encodes renditions of the training video at bitrates corresponding to a predetermined bitrate ladder (e.g., a 54-bitrate ladder) and selects the quality-maximizing resolution for inclusion in the convex hull of the training video at each bitrate in the predetermined bitrate ladder. Additionally or alternatively, the system can interpolate between data points in the convex hull of the training video to fully characterize the encoding space of the training video. Furthermore, the system can execute a search algorithm (e.g., binary search) to calculate a more precise bitrate (e.g., bitrates between the bitrates of the predetermined bitrate ladder) at which the quality-maximizing resolution transitions between adjacent discrete resolutions.

In one implementation, the system can store the quality metric calculated for each rendition of the training video that is identified as being part of the convex hull of the training video. Thus, in this implementation, the system can train the convex hull estimation model to additionally estimate the quality of each bitrate-resolution pair in an estimated convex hull of an input video.

In another implementation, the system can perform multiple iterations of this convex hull identification process for each of a set of viewing conditions by changing (for each iteration of the convex hull identification process) the quality metrics calculated for each rendition of the training videos to a quality metric that specifically characterizes the quality of the rendition for a particular viewing condition in the set of viewing conditions. Thus, the system can train separate convex hull estimation models for each viewing condition in a predetermined set of viewing conditions by training each model on a set of training examples particular to each viewing condition.

The system can also calculate the convex hull of a training video via trial encodings according to any other algorithm in order to sufficiently characterize the encoding space for the training video.

To complete a training example based on a training video from the set of training videos, the system can extract a set of video-level features from the training video according to the above described feature extraction process. Once the system extracts a vector of video-level features from the training video, the system has generated a training example including an example input (the video-level features) and an example output (the convex hull including a set of quality-maximizing bitrate-resolution pairs). Therefore, the system can generate a corpus of training examples for the convex hull estimation model by executing the above described steps across a set of training videos. Once the system has generated a corpus of training examples, the system can execute a back-propagation algorithm or other supervised learning algorithm to train the convex hull estimation model according to the corpus of training examples.

5.2 Convex Hull Estimation Model

Once the system has trained a convex hull estimation model (or a set of convex hull estimation models) according to the aforementioned training process, the system can access the trained version of the convex hull estimation model while executing Block S120 in order to estimate a set of bitrate-resolution pairs approximating the quality-maximizing convex hull of an input video without performing the aforementioned trial encoding process to fully characterize the encoding space of the input video. More specifically, the system can: generate a feature vector for the video segment based on the set of video features; and execute the convex hull estimation model (e.g., an artificial neural network) on the feature vector to generate a set of quality-maximizing bitrate-resolution pairs.

Thus, the system executes the convex hull estimation model on a set of video-level features for an input video and the convex hull estimation model outputs, substantially in real time (e.g., within 500 ms), an estimate of the convex hull of the input video in the form of a set of bitrate-resolution pairs. Each bitrate-resolution pair of the estimated convex hull for the input video estimates the quality-maximizing resolution corresponding to a particular bitrate of the bitrate-resolution pair.

In one implementation, the system evaluates a convex hull estimation model on an input video that outputs a set of 54 bitrate-resolution pairs that span an encoding space between 10,000 kbps and 250 kbps, as the convex hull of the input video. However, the system can evaluate a convex hull estimation model that outputs any number of bitrate-resolution pairs over any range of bitrates. Furthermore, the system can evaluate a convex hull estimation model that outputs an adaptable number of bitrate-resolution pairs across an adaptable range, wherein both the number of bitrates and the range of bitrates are dependent on the video-level feature vector of the input video.

In another implementation, the system can evaluate the convex hull estimation model on an input video to output a set of bitrate-resolution pairs and predict, for each bitrate-resolution pair, the quality score of the input video encoded according to the bitrate resolution pair. More specifically, the system can: generate a set of bitrate-resolution pairs based on a set of video features of the input video via the convex hull estimation model, each bitrate-resolution pair in the set of bitrate-resolution pairs: defining a bitrate; defining a resolution estimated to maximize a quality score characterizing the video segment encoded at the bitrate; and defining the quality score of a rendition of the video segment corresponding to the bitrate-resolution pair. Thus, the system can leverage the predicted quality score corresponding to each bitrate-resolution pair to inform the bitrate-resolution pair selection process described in further detail below in order to select a subset of the bitrate-resolution pairs for the video-specific encoding ladder that most improve the aggregate quality of the input video when viewed by the predicted audience of the video.

In another implementation, the system can evaluate a set of convex hull estimation models for each viewing condition in a predicted set of audience viewing conditions. More specifically, the system can: for each viewing condition in a set of viewing conditions, generate a viewing-condition-specific set of bitrate-resolution pairs based on the set of video features via a convex hull estimation model corresponding to the viewing condition; compile each viewing-condition specific set of bitrate-resolution pairs into the set of bitrate-resolution pairs; for each viewing condition in the set of viewing conditions, access a viewing-condition-specific distribution of audience bandwidths representative of likely viewers of the video segment satisfying the viewing condition; compile each viewing-condition-specific distribution of audience bandwidths into a set of distributions of audience bandwidths; and append successive bitrate-resolution pairs in the set of bitrate resolution pairs to the encoding ladder for the video segment based on a marginal quality-per-cost score of each bitrate-resolution pair in the set of bitrate-resolution pairs, the marginal quality-per-cost score based on the set of distributions of audience bandwidths and the current set of bitrate-resolution pairs in the encoding ladder. Thus, instead of selecting bitrate-resolution pairs for the video-specific encoding ladder for the input video from a single estimated convex hull of the input video, the system can select bitrate-resolution pairs from any of the estimated convex hulls corresponding to the various viewing conditions in the predicted audience of the input video. Therefore, based on the predicted audience distribution across these viewing conditions and the predicted and/or representative bandwidth distribution of the audience satisfying each viewing condition, the system can better select bitrate-resolution pairs that maximize quality for the particular audience of the input video.

6. Audience Data Access

Generally, as shown in FIGS. 1, 2, and 3, the system can access a distribution of audience bandwidths representative of likely viewers of the video segment in Block S130. More specifically, the system can: access historical audience data for a set of similar videos and/or currently available audience data for the input video itself and predict a distribution of audience bandwidths representing likely viewers of the input video. Thus, the system can estimate the effect of each bitrate-resolution pair included in the estimated convex hull of the input video on the aggregate viewing quality for viewers of the input video by multiplying the quality score corresponding to each bitrate-resolution pair by the number of viewers in a segment of the distribution of audience bandwidths that are predicted to view the bitrate-resolution pair.

In order to access an audience bandwidth distribution that is representative of an audience of the input video, the system, or another system cooperating with the system, can record the bandwidth of each viewer of historical videos streamed by the system. More specifically, for each viewer of a previous internet video stream, the system can record the bandwidth of the viewer's connection with the streaming server for the duration of the viewer's viewing time of the internet stream and average this bandwidth to obtain one value representing the viewers average bandwidth for the stream.

Before selecting a set of bitrate-resolution pairs for the video-specific encoding ladder of the input video, the system accesses a set of audience data in the form of a distribution of audience bandwidths and resolutions from a set of videos representing the input video. In one implementation, the system retrieves audience data of similar length, similar content classification, and similar video-level features. Alternatively, the system can retrieve audience data from videos published by the same publisher of the input video. The system retrieves viewing data that can include a set of audience bandwidths, resolutions, and/or viewing conditions. For example, an individual data point in the audience data can include a single audience member's viewing bitrate and conditions such as 1400 kbps at 720p on a mobile device. In one implementation, the system can retrieve a compressed representation of the audience data such as a set of distributions of audience bandwidths, each distribution corresponding to a particular viewing condition in a set of viewing conditions. Additionally or alternatively, the system can retrieve a single distribution representing the audience bandwidths at all viewing conditions.

Once the system has recorded bandwidth data for a set of previous internet streams, the system can calculate a weighted average distribution for the input video based on audience bandwidth distribution for a selected set of previous videos. In one implementation, the system can select similar videos to the input video based on the publisher of the input video. For example, the system can select previous videos from the same publisher and calculate the weighted average distribution from the audience data of these videos. In another example, the system can: generate a video-level feature vector for the set of historical videos; calculate a similarity index between the input video and each historical video in the set of historical videos; select a subset of the historical videos, in response to the similarity index of each historical video in the subset of historical videos exceeding a threshold similarity index; and calculate a weighted average distribution based on audience bandwidth distributions of the selected subset of historical videos. However, the system can identify a set of similar videos to the input video and calculate a weighted average audience bandwidth distribution based on this set of similar videos in any other way.

In one implementation, the system can also estimate, based on device audience data from historical internet stream of historical video, the viewing condition of each viewer of these historical videos, and record multiple audience bandwidth distributions for each historical video corresponding to each viewing condition. Thus, the system can access an audience bandwidth distribution for each viewing condition supported by the system and better estimate changes in viewing quality over multiple viewing conditions when accounting for the likely viewers of the input video. Alternatively, the system can access a separate audience viewing condition distribution indicating the proportion of viewers estimated to satisfy each viewing condition.

In another implementation, the system can also record and/or access historical geographic viewer data in order to estimate an audience geographic distribution for the input video. Thus the system can better predict the distribution costs of the input video based on the predicted locations of viewers of the input video.

7. Top Rendition Selection

In one variation, in Block S140, the system selects a top bitrate-resolution pair (i.e. highest bitrate-resolution pair, maximum bitrate-resolution pair) for the video-specific encoding ladder from the set of bitrate-resolution pairs (e.g., a highest quality rendition of the video for the video-specific encoding ladder), where the top bitrate-resolution pair. More specifically, the system selects a top bitrate-resolution pair from the estimated convex hull of an input video that, when the input video is encoded according to the top bitrate-resolution pair, the quality of that rendition is greater than a threshold quality within a confidence interval.

In order to estimate the top bitrate-resolution pair for the video-specific encoding ladder in the convex hull of the input video, the system (or a related system coordinating with the system) can train a machine learning model (e.g., a boosted tree model) that takes in a convex hull estimate for an input video and outputs a top bitrate-resolution pair (hereinafter the "top rendition model"). The top rendition model can be trained on the same or similar set of training videos as the convex hull estimation model, however, when preparing a corpus of training examples for the top rendition model, the system can further calculate a top bitrate-resolution pair in the fully characterized encoding space of the training video. The system can calculate the top bitrate-resolution pair based on conditional logic, such as by calculating the partial derivative of bitrate with respect to quality of the convex hull of the training video and identifying a bitrate at which the derivative falls below a threshold value. Alternatively, the system can select a lowest bitrate on the convex hull of the training video that corresponds to a quality above a threshold quality. The system can therefore train the top rendition model according to a supervised learning algorithm based on a set of training examples, wherein each training example includes the convex hull of a training video calculated according to the trial encoding process (as an input) and a top bitrate for the same training video (as an output).

Alternatively, the system can select the top bitrate-resolution pair from the set of bitrate-resolution pairs directly via conditional logic. In implementations where the convex hull estimation model outputs a quality score for each bitrate-resolution pair in the estimated convex hull of the input video, the system can: identify, in the set of bitrate-resolution pairs, a set of high-quality bitrate-resolution pairs characterized by quality scores greater than a threshold quality score; and select the top bitrate-resolution pair from the set of high-quality bitrate-resolution pairs, the top bitrate-resolution pair defining the top bitrate equal to a minimum bitrate from the set of high-quality bitrate resolution pairs. Thus, the system selects the bitrate-resolution pair characterized by the lowest bitrate that is also characterized by greater than a threshold quality score. For example, the system can select the top bitrate-resolution pair as the lowest bitrate-resolution pair with an estimated quality score greater than VMAF 94.

In another implementation, the system can select a top bitrate-resolution pair by identifying the point along the estimated convex hull of an input video where the quality of the rendition does not substantially increase with an increase in bitrate (i.e. there are diminishing returns in quality for increases in bitrate). For example, the system can select a bitrate-resolution pair in the set of bitrate-resolution pairs at which the derivative of quality with respect to bitrate is less than a threshold for the particular input video. Thus, the system selects the top bitrate-resolution pair in the video-specific encoding ladder for the video in order to constrain the encoding space for the input video to bitrates that provide meaningful differences in video quality.

Additionally or alternatively, the system can access audience data for the training video and select a top bitrate-resolution pair consistent with a predetermined percentile (e.g., 99%) of audience bandwidths for the training video. Furthermore, the system can select a top bitrate-resolution pair that is the higher or lower result of the aforementioned calculation methods. Furthermore, the system can select a different top bitrate based on the intended audience of the input video and audience data corresponding to the intended audience. For example, the system can select a top bitrate corresponding to a VMAF score of 88 for Canadian users while selecting a top bitrate corresponding to a VMAF score of 93 for Mexican users. Therefore, the system can train separate top bitrate models for each potential audience segment of an input video.

Upon accessing a trained version of the top rendition model the system can evaluate the top rendition model with the estimated convex hull of the input video as input to the top rendition model to estimate a top bitrate-resolution pair for the input video. Once the system estimates a top bitrate-resolution pair for the input video the system can remove (e.g., from consideration for the video-specific encoding ladder for the video) bitrate-resolution pairs in the estimated convex hull of the input video characterized by bitrates above the estimated top bitrate-resolution pair of the input video.

8. Bottom Rendition Selection

In addition to selecting a top bitrate-resolution pair for an input video (i.e. a top rendition for the video-specific encoding ladder for the input video), in one variation, the system can also select a bottom bitrate-resolution pair (i.e. a lowest bitrate-resolution pair, a minimum bitrate-resolution pair) representing a lowest quality rendition of the video in the video-specific encoding ladder for an input video in Block S150. More specifically, the system can select a bottom bitrate-resolution pair for the video-specific encoding ladder from the set of bitrate-resolution pairs, the bottom bitrate-resolution pair defining a bottom bitrate in the encoding ladder for the input video, where each additional bitrate-resolution pair included in the encoding ladder is characterized by a bitrate greater than the bottom bitrate.

In one implementation, the system can train and evaluate a bottom rendition model based on the same or similar set of training videos as the convex hull estimation model and/or the top rendition model. However, when preparing a set of training examples for the bottom rendition model, the system can calculate, from the fully characterized encoding space of the training video, a bottom bitrate-resolution pair for the training video. Additionally or alternatively, the system can access audience data for the training video and select a bottom bitrate consistent with a predetermined percentile (e.g., 1%) of audience bandwidths for the training video. As described above, the system can also train separate bottom rendition models based on different minimum acceptable qualities according to variations in the preferences of various audience segments. Furthermore, the system can select a bottom bitrate that is the higher or lower result of the aforementioned calculation methods. The system can identify a lowest bitrate-resolution pair, along the convex hull of the training video, at which the quality of the encoded training video at the bitrates is greater than or equal to a minimum threshold quality for the video as the bottom bitrate of the training video.

The system can then train the bottom rendition model according to a supervised learning algorithm based on a set of training examples, wherein each training example includes the convex hull of a training video calculated according to the trial encoding process (as an input) and a bottom bitrate-resolution pair for the same training video (as an output).

In implementations where the convex hull estimation model also estimates a quality score for each bitrate-resolution pair in the estimated convex hull of the input video, the system can execute conditional logic based on the estimated quality score of each bitrate-rendition pair to select the bottom bitrate-resolution pair for the video-specific encoding ladder of the input video. More specifically, the system can: identify a set of bitrate-resolution pairs characterized by a quality score greater than a threshold quality score; and select the bitrate-resolution pair in the identified set of bitrate-resolution pairs characterized by the lowest bitrate in the identified set of bitrate-resolution pairs.

In another implementation, based on the distribution of audience bandwidths corresponding to the input video, the system can: identify a threshold percentile in the distribution of audience bandwidths; and select a first bitrate-resolution pair defining a bitrate greater than the threshold percentile as the bottom bitrate-resolution pair. Thus, the system can ensure that a predetermined percentile of likely viewers of the input video will be able to stream the input video.

However, the system can select a bottom bitrate-resolution pair from the estimated convex hull of the input video for inclusion in the video-specific encoding ladder of the input video in any other way.

9. Video-Specific Encoding Ladder Selection

Generally, in Block S160, the system can select an encoding ladder for the input video, including a subset of bitrate-resolution pairs in the set of bitrate resolutions pairs estimated to predicted to yield an aggregate quality score near a maximum possible quality score for the video segment based on the distribution of audience bandwidths. More specifically, in Block S160 the system can select a particular subset of bitrate-resolution pairs—in the set of bitrate-resolution pairs—for the video-specific encoding ladder based on the distribution of audience bandwidths. Thus, the system can select a set of bitrate-resolution pairs (characterized by bitrates between the selected top bitrate and bottom bitrate of the input video) for inclusion in the video-specific encoding ladder for the input video based on audience data for videos related to the input video.

The system can select a subset of bitrate-resolution pairs from the set of bitrate-resolution pairs between the top rendition and the bottom rendition along the estimated convex hull of the input video, according to a user-defined setting (e.g., the system can offer video-specific encoding ladders with any number of renditions between 3 and 20 renditions). Alternatively, the system can estimate a number of renditions included in the video-specific encoding ladder from the estimated convex hull of the input video based on audience bandwidth data and/or audience viewing condition data.

Thus, in implementations where the system selects a bottom bitrate-resolution pair and a top bitrate-resolution pair, the system can: select the subset of bitrate-resolution pairs in the set of bitrate-resolution pairs based on the distribution of audience bandwidths, the subset of bitrate-resolution pairs defining bitrates less than the top bitrate, and/or select the subset of bitrate-resolution pairs in the set of bitrate-resolution pairs based on the distribution of audience bandwidths, the subset of bitrate-resolution pairs defining bitrates greater than the bottom bitrate.

In Block S160, the system selects a video-specific encoding ladder for the input video including a subset of bitrate-resolution pairs (i.e. renditions) in the set of bitrate-resolution pairs estimated to maximize viewing quality over the distribution of audience bandwidths. More specifically, the system can select renditions of the video that the system estimates provide highest video quality for the largest number of audience members given each audience member's viewing bitrate according to the retrieved audience data. Because each bitrate-resolution pair included in the convex hull includes the estimated highest quality resolution for a given bitrate, any audience member that is viewing the input video at bandwidth equal to a bitrate of a rendition included in the video-specific encoding ladder is viewing the highest quality rendition for their bitrate. However, as an audience member's viewing bitrate increases from the bitrate of the rendition before reaching an adjacent rendition in the video-specific encoding ladder, the difference between the quality of the rendition and the highest possible quality given the increased bandwidth of the audience member increases. Thus, the system can select renditions for the video-specific encoding ladder of the input video, in order to minimize the difference between audience bandwidths in the distribution of audience bandwidths and the bitrates corresponding to selected renditions in the video-specific encoding ladder of the application.

Alternatively, the system can minimize a function of the difference between the audience bandwidths in the distribution of audience bandwidths and the bitrates of the selected renditions of the video-specific encoding ladders. In this implementation, the system can utilize a function describing quality as function of bitrate, wherein the function is based on an average fit of calculated convex hulls for a set of training videos. Thus, the system can select a subset of renditions from the estimated convex hull of the input video that minimizes the difference between audience bandwidths in a distribution of audience bandwidths and bitrates of the nearest rendition in the video-specific encoding ladder with a bitrate less than the audience bandwidths.

In one variation, the system can execute an iterative selection process by repeatedly selecting individual bitrate-resolution pairs from the set of bitrate-resolution pairs for the video-specific encoding ladder, based on a marginal quality-per-cost score of each bitrate-resolution pair in the set of bitrate-resolution pairs and based on the bitrate-resolution pairs already included in the video-specific encoding ladder. Thus, in each iteration of this iterative selection process, the system: scores each bitrate-resolution pair in the set of bitrate-resolution pairs of the estimated convex hull that have not yet been selected for inclusion in the video-specific encoding ladder based on the cost of generating, maintaining, and distributing a rendition of the input video corresponding to each bitrate-resolution pair and the resulting improvement in quality for a predicted distribution of audience bandwidths given the set of bitrate-resolution pairs already included in the video-specific encoding ladder of the input video. Therefore, during each iteration, the system selects the bitrate-resolution pair in the set of bitrate-resolution pairs that most improves the quality of the input video across the predicted set of viewers of the input video when compared to the status quo encoding ladder. This process is described in further detail below.

In another variation, the system can execute Block S160 and select a video-specific encoding ladder for the input video for each viewing condition or geographic region indicated by the representative audience data for the input video. Alternatively, the system can select particular renditions in a single video-specific encoding ladder that address particular sections of the audience bitrate distribution across viewing conditions or for particular geographic regions. Therefore, the steps described below with respect to Block S160 can be executed once or multiple times for the same input video. Thus, the system can evaluate the relative costs of selecting additional bitrate-resolution pairs for a single encoding ladder or generating a second encoding ladder specific to a separate viewing condition.

9.1 Iterative Bitrate-Resolution Pair Selection

Generally, as shown in FIG. 3, the system can select successive bitrate-resolution pairs via an iterative selection process in Block S180. More specifically, the system can append successive bitrate-resolution pairs in the set of bitrate resolution pairs to an encoding ladder for the video segment based on a marginal quality-per-cost score of each bitrate-resolution pair in the set of bitrate-resolution pairs (calculated based on a predicted quality score of the bitrate-resolution pair), the marginal quality-per-cost score based on the distribution of audience bandwidths, and a current set of bitrate-resolution pairs included in the video-specific encoding ladder. Additionally, the system can recalculate the marginal quality-per-cost score for each bitrate-resolution pair in the set of bitrate resolution pairs during each iteration of this selection process to account for changes in a predicted aggregate viewing quality of the current video-specific encoding ladder prior to selecting an additional bitrate-resolution pair for the video-specific encoding ladder. During each iteration of the iterative selection process, the system can also compare the set of marginal quality-per-cost scores of the set of bitrate-resolution pairs to a threshold marginal quality-per-cost score and, in response to a marginal quality-per-cost score in the set of marginal quality-per-cost scores exceeding the threshold quality-per-cost score, append a bitrate-resolution pair characterized by a maximum quality-per-cost score to the video-specific encoding ladder for the input video.

In one example, the system can select an additional bitrate-resolution pair for inclusion in the video-specific encoding ladder in response to a quality improvement-per-cost of the rendition greater than a threshold. In another example, the system can select an additional bitrate-resolution pair for inclusion in the video-specific encoding ladder in response to a quality improvement that is predicted to result in a positive return-on-investment (e.g., a positive profit margin) when compared with the cost of producing a rendition of the input video according to the additional bitrate-resolution pair.

In order to calculate the marginal quality-per-cost score for each bitrate-resolution pair in the set of bitrate-resolution pairs, the system can: calculate a rendition cost of the bitrate-resolution pair, which accounts for the encoding cost, the storage cost, and/or the distribution cost of including the bitrate-resolution pair in the video-specific encoding ladder for the input video; calculate a marginal quality score, representing an aggregate improvement in the viewing quality over the predicted distribution of audience bandwidths (i.e. the audience bandwidth distribution) in response to the addition of the bitrate-resolution pair to the video-specific encoding ladder of the input video; and divide the marginal quality score by the rendition cost to obtain a marginal quality-per-cost score for the bitrate-resolution pair. More specifically, the system can, for each bitrate-resolution pair in the set of bitrate-resolution pairs: calculate a rendition cost of the bitrate-resolution pair, the rendition cost representing a cost of a rendition of the video segment corresponding to the bitrate-resolution pair in Block S182; calculate a marginal quality score of the bitrate-resolution pair based on the distribution of audience bandwidths and the current set of bitrate-resolution pairs in the encoding ladder, the marginal quality score representing an aggregate improvement in viewing quality according to the audience bandwidth distribution in response to an addition of the bitrate-resolution pair to the encoding ladder in Block S184; and calculate a marginal quality-per-cost score of the bitrate-resolution pair based on the marginal quality score of the bitrate-resolution-pair and the rendition cost of the bitrate-resolution pair in Block S186.

In one implementation, the system can execute a cost estimation function that estimates the cost of encoding, storing, and/or distributing a rendition of the input video encoded according to a bitrate-resolution pair based on audience data (e.g., audience bandwidth distribution, audience geographic distribution, audience viewing condition distribution) and based on the bitrate defined by the bitrate-resolution pair and the resolution defined by the bitrate-resolution pair. More specifically, the system can: calculate an encoding cost of a rendition corresponding to the bitrate-resolution pair; calculate a storage cost of the rendition corresponding to the bitrate-resolution pair; calculate a distribution cost of the rendition corresponding to the bitrate-resolution pair; and combine the encoding cost, the storage costs, and the distribution cost to calculate the rendition cost.

In another implementation, the system can calculate the marginal quality score of each remaining bitrate-resolution pair in the set of bitrate-resolution pairs by multiplying a predicted quality score (according to a particular quality metric) of the bitrate-resolution pair by a segment (e.g., proportion) of the audience bandwidth distribution of the input video that is characterized by a bandwidth sufficient to view a rendition of the input video encoded according to the bitrate and resolution of the bitrate-resolution pair and a bandwidth that is not large enough to view a higher bitrate rendition already present in the encoding ladder. The system can then subtract an aggregate quality score (calculated over the same region of the audience bandwidth distribution) for an adjacent lower rendition in the video-specific encoding ladder to determine a marginal aggregate quality score that represents an improvement in aggregate viewing quality caused by the addition of the bitrate-resolution pair to the video-specific encoding ladder. More specifically, the system can, for each bitrate-resolution pair in the set of bitrate-resolution pairs: identify a lower adjacent bitrate-resolution pair in the encoding ladder relative to the bitrate-resolution pair; identify a higher adjacent bitrate-resolution pair in the encoding ladder relative to the bitrate-resolution pair; calculate a first predicted quality score of the bitrate-resolution pair estimating a viewing quality of a first rendition of the video segment corresponding to the bitrate-resolution pair; integrate the first quality score by a bandwidth segment in the audience bandwidth distribution to generate an improved aggregate quality score, the bandwidth segment extending from a lower bandwidth defined by the bitrate-resolution pair to a higher bandwidth defined by the higher adjacent bitrate-resolution pair; calculate a second quality score of the lower adjacent bitrate-resolution pair estimating a viewing quality of a second rendition of the video segment corresponding to the lower adjacent bitrate-resolution pair; multiply the second quality score by the bandwidth segment in the audience bandwidth distribution to generate a status quo aggregate quality score; and subtract the status quo aggregate quality score from the improved aggregate quality score to calculate the marginal quality score of the bitrate-resolution pair. Thus, the system can precisely predict differences in aggregate viewing quality based on the estimated quality score (e.g., estimated by the convex hull estimation model) and the audience bandwidth distribution of the input video. In one example, the system can also multiply the predicted quality score of the bitrate-resolution pair by the bandwidth segment in multiple audience bandwidth distributions, where each audience bandwidth distribution represents a predicted audience characterized by a viewing condition in a set of viewing conditions. The system can then device the marginal quality score for each bitrate-resolution pair by the rendition cost of the bitrate-resolution pair to obtain a marginal quality-per-cost score for the bitrate-resolution pair.

Once the system has calculated a marginal quality-per-cost score, the system can evaluate whether the magnitude of any marginal quality-per-cost score of any bitrate-resolution pair justifies the inclusion of a successive bitrate-resolution pair in the video-specific encoding ladder in Block S188. More specifically, in response to a quality-per-cost score of at least one bitrate-resolution pair in the set of bitrate-resolution pairs exceeding a threshold quality-per-cost score, the system can: select a first successive bitrate-resolution pair in the set of bitrate-resolution pairs, the first successive bitrate resolution pair characterized by a maximum quality-per-cost score; remove the successive bitrate-resolution pair from the set of bitrate-resolution pairs; and append the successive bitrate-resolution pair to the encoding ladder. Thus, in each iteration of the iterative selection process, the system selects a bitrate-resolution pair for the video-specific encoding ladder that is characterized by the highest marginal quality-per-cost score greater than a threshold marginal quality-per-cost score. The system can: continue the iterative selection process until none of the marginal quality-per-cost scores characterizing the remaining bitrate-resolution pairs in the set of bitrate-resolution pairs exceed the threshold quality-per-cost score; and, in response to detecting this condition, publish the video-specific encoding ladder of the input video.

In one implementation, the system can iteratively select a bitrate-resolution pair from the set of bitrate-resolution pairs based on a predicted increase in profit (e.g., from providing the video streaming services for the input vide) resulting from the addition of the bitrate-resolution pair. More specifically, the system can calculate a profit score (e.g., as an alternative for the quality-per-cost score) for each bitrate-resolution pair in the set of bitrate-resolution pairs by: estimating an increase in revenue based on the marginal quality score of each bitrate-resolution pair; and subtracting the increase in revenue by the rendition cost of the bitrate-resolution pair. Thus, by scoring each bitrate-resolution pair based on the estimated increase in profit resulting from the addition of the bitrate-resolution pair to the video-specific encoding ladder, the system can evaluate whether adding each bitrate-resolution pair to the encoding ladder is monetarily valuable.

In order estimate the resulting revenue from the marginal improvement in aggregate viewing quality over the distribution of audience bandwidths, the system can train a profit estimation model to characterize the effects of increased viewing quality on viewing time for historical videos and apply this model to the characteristics of the input video and the increase in quality predicted by the marginal quality score of each bitrate-resolution pair. Alternatively, the system can execute a set of heuristics (e.g., a mathematical function) to estimate the increase in revenue from the marginal quality score of each bitrate-resolution pair. In this implementation, the system can set a threshold for selecting a bitrate-resolution pair based on the profit score of each bitrate resolution pair in the set of bitrate-resolution pairs at zero such that the system continues selecting profitable bitrate-resolution pairs for the encoding ladder until the cost of producing additional renditions of the input video exceeds any incremental profits.

10. Encoding Ladder Generation

Upon selecting a set of bitrate-resolution pairs for the video-specific encoding ladder of an input video, the system can generate an encoding ladder for the video segment including the top bitrate-resolution pair, the bottom bitrate-resolution pair, and/or the subset of bitrate-resolution pairs in Block S170. More specifically, the system can encode a set of renditions of the video segment, each rendition including an encoding of the video segment characterized by a bitrate and a resolution of a bitrate-resolution pair in the encoding ladder and publishing a manifest file representing the encoding ladder for an internet stream. In one example, the system can encode the input video using a video codec (e.g., H.264, H.265) and publish the encoding ladder as an HLS manifest file.

In one implementation, the system can record audience data for the input video and, after an initial time interval, the system can remove renditions from the video-specific encoding ladder (in order to improve performance and/or save server storage space), add renditions to the video-specific encoding ladder, and/or execute Blocks of the method S100 based on audience data for the input video itself instead of audience data for a representative set of other videos similar to the input video. Therefore, the system can periodically update the video-specific encoding ladder in response to changes in the audience data for the input video.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for generating an encoding ladder comprising:
   extracting a set of video features representing properties of a video segment based on a sequence of frames, the set of video features comprising:
      a set of motion features;
      a set of visual complexity features; and
      a set of content features;
   generating a set of bitrate-resolution pairs based on the set of video features, each bitrate-resolution pair in the set of bitrate-resolution pairs comprising:
      a bitrate; and
      a resolution predicted to yield a quality score exceeding a threshold quality score, the quality score characterizing the video segment encoded at the bitrate and the resolution;
   accessing a distribution of audience bandwidths representative of a predicted viewer population of the video segment;
   selecting a subset of bitrate-resolution pairs in the set of bitrate-resolution pairs based on the distribution of audience bandwidths; and generating an encoding ladder for the video segment comprising the subset of bitrate-resolution pairs.

2. The method of claim 1:
further comprising, selecting a highest bitrate-resolution pair in the set of bitrate-resolution pairs, the highest bitrate-resolution pair defining a highest bitrate; and
wherein selecting the subset of bitrate-resolution pairs in the set of bitrate-resolution pairs based on the distribution of audience bandwidths comprises selecting the subset of bitrate-resolution pairs in the set of bitrate-resolution pairs based on the distribution of audience bandwidths, the subset of bitrate-resolution pairs defining bitrates less than the highest bitrate.

3. The method of claim 2, further comprising:
selecting a lowest bitrate-resolution pair in the set of bitrate-resolution pairs, the lowest bitrate-resolution pair defining a lowest bitrate; and
wherein selecting the subset of bitrate-resolution pairs in the set of bitrate-resolution pairs based on the distribution of audience bandwidths comprises selecting the subset of bitrate-resolution pairs in the set of bitrate-resolution pairs based on the distribution of audience bandwidths, the subset of bitrate-resolution pairs defining bitrates greater than the lowest bitrate.

4. The method of claim 3, wherein extracting the set of video features representing properties of the video segment based on the sequence of frames comprises:
calculating the set of motion features based on consecutive frames in the sequence of frames;
for each frame in the sequence of frames:
calculating a set of frame-level visual complexity features for the frame; and
storing the set of frame-level visual complexity features for the frame in the set of visual complexity features;
passing the sequence of frames into a video classification model; and
extracting an intermediate layer activation of the video classification model executing on the sequence of frames to generate the set of content features, the set of content features representing a content classification of the video segment.

5. The method of claim 4, further comprising:
identifying a set of groups-of-pictures in the video segment; and
extracting an I-frame from each group-of-pictures in the video segment.

6. The method of claim 5, wherein selecting the subset of bitrate-resolution pairs in the set of bitrate-resolution pairs based on the distribution of audience bandwidths comprises selecting the subset of bitrate-resolution pairs predicted to yield an aggregate quality score approximating a maximum aggregate quality score of the video segment viewed according to the distribution of audience bandwidths.

7. The method of claim 1, further comprising:
selecting a lowest bitrate-resolution pair in the set of bitrate-resolution pairs, the lowest bitrate-resolution pair defining a lowest bitrate; and
wherein selecting the subset of bitrate-resolution pairs in the set of bitrate-resolution pairs based on the distribution of audience bandwidths comprises selecting the subset of bitrate-resolution pairs in the set of bitrate-resolution pairs based on the distribution of audience bandwidths, the subset of bitrate-resolution pairs defining bitrates greater than the lowest bitrate.

8. The method of claim 1, wherein extracting the set of video features representing properties of the video segment based on the sequence of frames comprises:
calculating the set of motion features based on consecutive frames in the sequence of frames;
for each frame in the sequence of frames:
calculating a set of frame-level visual complexity features for the frame; and
storing the set of frame-level visual complexity features for the frame in the set of visual complexity features;
passing the sequence of frames into a video classification model; and
extracting an intermediate layer activation of the video classification model executing on the sequence of frames to generate the set of content features, the set of content features representing a content classification of the video segment.

9. The method of claim 1, further comprising:
identifying a set of groups-of-pictures in the video segment; and
extracting an I-frame from each group-of-pictures in the video segment.

10. The method of claim 1, wherein selecting the subset of bitrate-resolution pairs in the set of bitrate-resolution pairs based on the distribution of audience bandwidths comprises selecting the subset of bitrate-resolution pairs predicted to yield an aggregate quality score approximating a maximum aggregate quality score of the video segment viewed according to the distribution of audience bandwidths.

11. A method for generating an encoding ladder comprising:
extracting a set of video features representing properties of a video segment based on a sequence of frames;
generating a set of bitrate-resolution pairs based on the set of video features, each bitrate-resolution pair in the set of bitrate-resolution pairs comprising:
a bitrate; and
a resolution predicted to yield a quality score exceeding a threshold quality score, the quality score characterizing the video segment encoded at the bitrate and the resolution;
accessing a distribution of audience bandwidths representative of a predicted viewer population of the video segment;
selecting a subset of bitrate-resolution pairs in the set of bitrate-resolution pairs based on the distribution of audience bandwidths; and
generating an encoding ladder for the video segment comprising the subset of bitrate-resolution pairs.

12. The method of claim 11, further comprising selecting a highest bitrate-resolution pair in the set of bitrate-resolution pairs, the highest bitrate-resolution pair defining a highest bitrate.

13. The method of claim 12, wherein selecting the subset of bitrate-resolution pairs in the set of bitrate-resolution pairs based on the distribution of audience bandwidths comprises selecting the subset of bitrate-resolution pairs in the set of bitrate-resolution pairs based on the distribution of audience bandwidths, the subset of bitrate-resolution pairs defining bitrates less than the highest bitrate.

14. The method of claim 11, further comprising selecting a lowest bitrate-resolution pair in the set of bitrate-resolution pairs, the lowest bitrate-resolution pair defining a lowest bitrate.

15. The method of claim 14, wherein selecting the subset of bitrate-resolution pairs in the set of bitrate-resolution pairs based on the distribution of audience bandwidths comprises selecting the subset of bitrate-resolution pairs in the set of bitrate-resolution pairs based on the distribution of audience bandwidths, the subset of bitrate-resolution pairs defining bitrates greater than the lowest bitrate.

16. The method of claim 11, wherein extracting the set of video features representing properties of the video segment based on the sequence of frames comprises:
 calculating a set of motion features based on consecutive frames in the sequence of frames;
 passing the sequence of frames into a video classification model; and
 extracting an intermediate layer activation of the video classification model executing on the sequence of frames to generate a set of content features, the set of content features representing a content classification of the video segment.

17. The method of claim 16, wherein extracting the set of video features representing properties of the video segment based on the sequence of frames further comprises, for each frame in the sequence of frames:
 calculating a set of frame-level visual complexity features for the frame; and
 storing the set of frame-level visual complexity features for the frame in a set of visual complexity features.

18. The method of claim 16, further comprising:
 identifying a set of groups-of-pictures in the video segment; and
 extracting an I-frame from each group-of-pictures in the video segment.

19. The method of claim 11, wherein selecting the subset of bitrate-resolution pairs in the set of bitrate-resolution pairs based on the distribution of audience bandwidths comprises selecting the subset of bitrate-resolution pairs predicted to yield an aggregate quality score approximating a maximum aggregate quality score of the video segment viewed according to the distribution of audience bandwidths.

20. A method for generating an encoding ladder comprising:
 extracting a set of video features representing properties of a video segment based on a sequence of frames:
 generating a set of bitrate-resolution pairs based on the set of video features;
 accessing a distribution of audience bandwidths representative of a predicted viewer population of the video segment;
 selecting a subset of bitrate-resolution pairs predicted to yield an aggregate quality score of the video segment, the aggregate quality score exceeding a threshold aggregate quality score; and
 generating an encoding ladder for the video segment comprising the subset of bitrate-resolution pairs.

* * * * *